United States Patent Office 3,483,244
Patented Dec. 9, 1969

3,483,244
4-THIOCYANOARYL METHYL CARBAMATES
Walter Reifschneider and Jacqueline S. Kelyman, Midland, Mich., assignors to The Dow Chemical Company, Midland, Mich., a corporation of Delaware
No Drawing. Filed Oct. 28, 1965, Ser. No. 505,448
Int. Cl. C07c *161/02;* A01n *9/18*
U.S. Cl. 260—454                         6 Claims

ABSTRACT OF THE DISCLOSURE

Substituted 4-thiocyanoaryl methyl carbamates having the formula

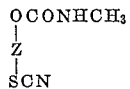

wherein Z in this and succeeding formulae represents one of the radicals

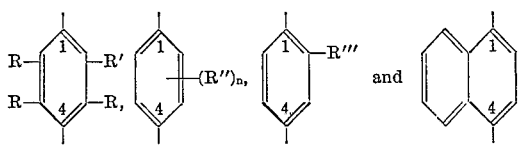

R represents hydrogen, halo, loweralkyl, alkylthio, or loweralkoxy, R' represents nitro or R, R" represents cyclohexyl, allyl or phenylthio; R''' represents trifluoromethyl, acetonyl, phenoxy, acetyl or cyano; and $n$ represents one of the integers 1 and 2. The compounds are prepared by reacting methyl isocyanate with a 4-thiocyanophenol having the formula

The compounds are useful as parasiticides.

---

The present invention is directed to substituted 4-thiocyanoaryl methyl carbamates having the formula

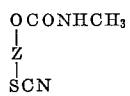

In this and succeeding formulae Z represents one of the radicals

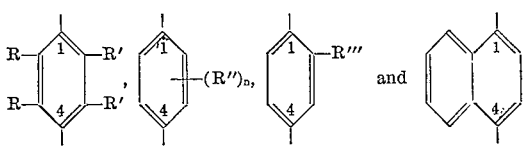

R represents hydrogen, halo, alkyl, alkylthio, or alkoxy, R' represents nitro or R, R" represents cyclohexyl, allyl or phenylthio; R''' represents a trichloromethyl, acetonyl, phenoxy, acetyl or cyano; and $n$ represents one of the integers 1 and 2. In the present specification and claims alkyl and alkoxy represent alkyl and alkoxy moieties containing from 1, to 2, to 3, to 4 carbon atoms such as methyl, methoxy, ethyl, ethoxy, propyl, propoxy, butyl and butoxy. The compounds of the present invention are solids which are of low solubility in water and of moderate to high solubility in many organic solvents. These compounds are useful as parasiticides for the control of many insect, arachnid, fungal, bacterial, aqueous and terrestrial plant and fish organisms, such as *Staphylococcus aureus, Aspergillus terreus, Rhizopus nigricans, Salmonella typhosa*, goldfish salvinia, moneywort, cabomba, pigweeds, cockroaches, soybean, cucumber, tomato, two spotted spider mites, etc.

The new compounds of the present invention are prepared by reacting methyl isocyanate with a 4-thiocyanophenol having the formula

The reaction is conveniently carried out in an inert organic solvent as reaction medium such as benzene, methylene chloride, tetrahydrofuran, xylene, toluene, carbon tetrachloride, ether and dioxane or in the presence of an excess amount of methyl isocyanate as reaction medium. The amounts of the reagents to be employed are not critical, some of the desired product being obtained when employing any proportion of the reactants. However, the reaction consumes the reactants in equimolar proportions and good yields are obtained when equimolar proportions of the 4-thiocyanophenol and methyl isocyanate are employed. The reaction is somewhat exothermic and takes place smoothly at temperatures of from −20 to 100° C. and preferably at temperatures of from 10 to 60° C.

In carrying out the reaction, the reactants are mixed and contacted together in any convenient fashion and the resulting mixture maintained for a period of time in the reaction temperature range. In a preferred embodiment, the yield of the desired product can be increased and the reaction period decreased by the addition of a catalytic amount of a basic material to the reaction mixture as a catalyst. Representative catalysts include triethylamine, sodium hydroxide, potassium hydroxide, trimethylamine, pyridine, picoline, lutidine and quinoline.

Following the recation, the reaction mixture is processed by conventional procedures to obtain the desired product. In one such conventional procedure the reaction medium is distilled to obtain the product as a residue. This residue can then be employed in pesticidal applications or further purified by such conventional procedures as washing or recrystallization.

Representative 4-thiocyanophenol compounds to be employed as starting materials in accordance with the teachings of this specification include: 2,3,5,6-tetrachloro-4 - thiocyanophenol, 2,5 - dibromo - 4 - thiocyanophenol, 2 - nitro - 3,6 - diethyl - 4 - thiocyanophenol, 2,6 - dicyclohexyl - 4 - thiocyanophenol, 3,5 - diphenylthio - 4-thiocyanophenol, 3 - phenylthio - 4 - thiocyanophenol, 2,5 - diethoxy - 4 - thiocyanophenol, 2 - butoxy - 4 - thiocyanophenol, 2,6 - dipropoxy - 4 - thiocyanophenol, 2-phenoxy - 4 - thiocyanophenol, 2 - trifluoromethyl - 4-thiocyanophenol, 2 - cyano - 4 - thiocyanophenol, 2,3,5,6-tetramethylthio - 4 - thiocyanophenol, 2,6 - diethyl - 4-thiocyanophenol, 3 - butylthio - 4 - thiocyanophenol, 2-nitro - 3 - chloro - 6 - propoxy - 4 - thiocyanophenol, and 2-acetonyl-4-thiocyanophenol.

The following examples merely illustrate the invention and are not to be construed as limiting.

EXAMPLE 1

*2-bromo-4-thiocyanophenyl methyl carbamate*

2-bromo-4-thiocyanophenol (11.5 grams; 0.05 mole), and methyl isocyanate (6 grams; 0.105 mole) were dispersed in 100 milliliters of tertahydrofuran. The resulting mixture was heated with stirring at 25–40° for 4 hours. Following the reaction period, the reaction mixture was distilled to remove the low boiling constituents and obtain the solid 2-bromo-4-thiocyanophenyl methyl carbamate product as a residue. This solid product was recrystallized from benzene. The recrystallized product melted at 124–127.5° C. and had a carbon and hydrogen content of 37.82 and 2.50 percent, respectively, as compared to the theoretical contents of 37.65 and 2.46 percent, respectively.

EXAMPLE 2

2-chloro-4-thiocyanophenyl methyl carbamate 2-chloro-4-thiocyanophenol (40 grams; 0.216 mole) and methyl isocyanate (14.3 grams; 0.25 mole) and 5 drops of triethylamine, were dispersed with stirring in 350 milliliters of methylene chloride. The reaction mixture was then allowed to stand at $+15°$ C. for 3 days. Following the reaction period, the reaction mixture was distilled under reduced pressure to remove the methylene chloride and obtain the product as a solid residue. This solid residue was recrystallized from benzene—Skelly Solv. 60–70 to obtain the 2-chloro-4-thiocyanophenyl methyl carbamate melting at 109–110.5° C. and having carbon and hydrogen contents of 44.55 and 2.85 percent, respectively, as compared to the theoretical contents of 44.54 and 2.91 percent.

In a similar manner, the following novel compounds of the present invention are prepared:

2-bromo-6-chloro-4-thiocyanophenyl methyl carbamate (melting at 141.5–144° C.) by reacting together 2-bromo-6-chloro-4-thiocyanophenol and methyl isocyanate in the presence of pyridine as catalyst.

2,6-dichloro - 4 - thiocyanophenyl methyl carbamate (melting at 124.5–128° C.) by reacting together 2,6-dichloro-4-thiocyanophenol and methyl isocyanate in the presence of 2,4-lutidine as catalyst.

3-chloro-4-thiocyano-phenyl methyl carbamate (melting at 87–89° C.) by reacting together 3-chloro-4-thiocyanophenol and methyl isocyanate in the presence of α-picoline as catalyst.

2-methyl-6-chloro-4-thiocyanophenyl methyl carbamate (melting at 147.5–148.5° C.) by reacting together 2-methyl-6-chloro-4-thiocyanophenol and methyl isocyanate.

2-methyl-4-thiocyanophenyl methyl carbamate (melting at 110–112° C.) by reacting together 2-methyl-4-thiocyanophenol and methyl isocyanate in the presence of triethylamine as catalyst.

3-methyl-4-thiocyanophenyl methyl carbamate (melting at 103–104.5° C.) by reacting together 3-methyl-4-thiocyanophenol and methyl isocyanate in the presence of quinoline as catalyst.

2-nitro-6-methyl-4-thiocyanophenyl methyl carbamate (melting at 98–100° C.) by reacting together 2-nitro-6-methyl-4-thiocyanophenol and methyl isocyanate in the presence of triethylamine as catalyst.

2-methoxy-4-thiocyanophenyl methyl carbamate (melting at 141–142° C.) by reacting together 2-methoxy-4-thiocyanophenol and methyl isocyanate in the presence of triethylamine as catalyst.

2-methylthio-4-thiocyanophenyl methyl carbamate (melting at 135–136° C.) by reacting together 2-methylthio-4-thiocyanophenol and methyl isocyanate in the presence of trimethylamine as a catalyst.

4-thiocyanonaphthyl methyl carbamate (melting at 148–150° C.) by reacting together 4-thiocyanonaphthol with methyl isocyanate in the presence of triethylamine as catalyst.

2-allyl-6-methyl-4-thiocyanophenyl methyl carbamate (molecular weight 262.33) by reacting together 2-allyl-6-methyl-4-thiocyanophenol and methyl isocyanate in the presence of sodium hydroxide as catalyst.

2,6-diallyl-4-thiocyanophenyl methyl carbamate (molecular weight 288.36) by reacting together 2,6-diallyl-4-thiocyanophenol and methyl isocyanate in the presence of trimethylamine as catalyst.

2-nitro-5,6-dichloro-4-thiocyanophenyl methyl carbamate (molecular weight 322.15) by reacting together 2-nitro-5,6-dichloro-4-thiocyanophenol and methyl isocyanate in the presence of 2,4-lutidine as catalyst.

3,5-diphenylthio-4-thiocyanophenyl methyl carbamate (molecular weight 424.55) by reacting together 3,5-diphenylthio-4-thiocyanophenol and methyl isocyanate in the presence of sodium hydroxide as catalyst.

2-acetyl-4-thiocyanophenyl methyl carbamate (molecular weight 250.28) by reacting together 2-acetyl-4-thiocyanophenol and methyl isocyanate in the presence of α-picoline as catalyst.

2,3,5,6 - tetraethylthio - 4-thiocyanophenyl methyl carbamate (molecular weight 448.71) by reacting together 2,3,5,6 - tetraethylthio-4-thiocyanophenol and methyl isocyanate in the presence of triethylamine as catalyst.

2-n-butoxy-4-thiocyanophenyl methyl carbamate (molecular weight 280.34) by reacting together 2-n-butoxy-4-thiocyanophenol and methyl isocyanate in the presence of pyridine as catalyst.

4-thiocyanophenyl methyl carbamate (melting at 121–122.5° C.) by reacting together 4-thiocyanophenol and methyl isocyanate in the presence of triethylamine as catalyst.

2-trifluoromethyl-4-thiocyanophenyl methyl carbamate (molecular weight 276.24) by reacting together 2-trifluoromethyl-4-thiocyanophenol and methyl isocyanate.

The compounds of the present invention or compositions containing the same can be applied to pests and their habitats and food in parasiticidal amounts to obtain excellent controls and kills of many organisms. Also, the compounds can be employed as slimicides in the white water in paper mills or the water employed in cooling towers. Additionally, the compounds can be included in inks, adhesives, soaps, cutting oils, high energy fuels or oil or latex paints to prevent mold and mildew, and the degradation of such products resulting from microbial attack. Further, the compounds can be employed as the toxic constituents in compositions for the control of blight and fungal diseases of various plants.

The compounds conveniently can be employed in liquid or dust formulations. In such usage, the compounds are modified with one or a plurality of adjuvants or helpers including water, organic solvents, petroleum oils, petroleum distillates or other liquid carriers, surface active dispersing agents and finely divided solids such as chalk, talc or bentonite. Particularly desirable liquid carriers are the petroleum distillates boiling almost entirely under 400° F. at atmospheric pressure and having a flash point above 80° F. Depending upon the concentration of the parasiticide compounds in such formulations, the augmented compositions are adapted to be distributed on plants or plant parts, or in soil, inks, adhesives, cutting oils, high energy fuels, paints, white or cooling water, or to be employed as concentrates and subsequently diluted with additional liquid or solid adjuvants to produce the ultimate treating compositions.

The exact concentration of the toxic constituent to be employed in the treating compositions is not critical and may vary considerably provided the required amount of effective agent is supplied on the plant or plant parts or in the soil, ink, adhesive, cutting oil, high energy fuel, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In a representative operation, 2,6-dichloro-4-thiocyanophenyl methyl carbamate, 2 - bromo-4-thiocyanophenyl methyl carbamate, 3 - chloro-4-thiocyanophenyl methyl carbamate, 2 - methylthio-4-thiocyanophenyl methyl carbamate each give complete kills of *Aspergillus terreus, Pulludaria pullulans, Rhizopus nigricans, Aerobacter aerogenes, Pseudomonas aeruginosa, Salmonella typhosa,* and *Staphylococcus aureus* when employed in aqueous compositions at a concentration of 1000 parts per million by weight. In further operation, 4-thiocyano-1-naphthyl methyl carbamate, 2-nitro-6-methyl-4-thiocyanophenyl methyl carbamate, 2,6 - dichloro-4-thiocyanophenyl methyl carbamate, and 2 - methylthio-4-thiocyanophenyl carbamate each give complete kills of elodia, moneywort, salvinia, cabomba and milfoil when added to the plants' aqueous environment in amounts sufficient to achieve a toxic compound concentration equivalent to 50 parts per million by weight.

The 4-thiocyanophenols employed as starting materials in the present invention can be prepared by known methods. In such known methods a substituted phenol corresponding to the formula

is thiocyanated by reacting the substituted phenol with thiocyanogen. In a representative operation a di(phenylthio)phenol is prepared by reacting a dihalophenol with cuprous phenyl mercaptide in the presence of a reaction medium comprised of quinoline or pyridine. The reaction mixture is maintained at a temperature of about 200° C. for a short period of time. Following the reaction period, the di(phenylthio)phenol is separated from the reaction mixture by conventional procedures and thereafter reacted with the thiocyanogen. In another representative operation, 2,3,5,6 - tetrabromophenol is reacted with cuprous alkyl mercaptide in the presence of 2,4-lutidine at a temperature of about 160° C. to produce the 2,3,5,6-tetraalkylthiophenol. The tetraalkylthiophenol product is then thiocyanated as previously described. In still another representative operation, 1,2,4,5-tetrahydroxybenzene is alkylated with a common alkylating agent such as alkyl iodide to produce the tetraalkoxybenzene which is then nitrated to produce the 1-nitro-2,3,5,6-tetraalkoxybenzene. This 1-nitro-2,3,5,6-tetraalkoxybenzene is then reduced to obtain the 2,3,5,6-tetraalkoxyaniline which is then diazotized to produce the 2,3,5,6-tetraalkoxyphenol. The 2,3,5,6-tetraalkoxyphenol is then thiocyanated as previously described.

We claim:

1. A substituted 4-thiocyanoaryl methyl carbamate corresponding to the formula

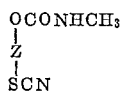

wherein Z represents a radical selected from the group consisting of

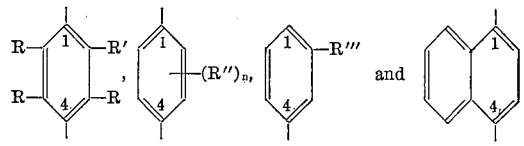

in which R represents a member of the group consisting of hydrogen, halo, alkyl, alkylthio and alkoxy wherein alkyl, alkylthio and alkoxy represent groups containing from 1 to 4 carbon atoms, inclusive; R' represents a member of the group consisting of nitro and R; R" represents a member of the group consisting of cyclohexyl, allyl and phenylthio; R''' represents a member of the group consisting of trifluoromethyl, acetonyl, phenoxy, acetyl and cyano; and $n$ represents one of the integers 1 and 2.

2. The compound of claim 1 wherein Z is 2-methylthiophenyl, 2-bromophenyl, 2-bromo-6-chlorophenyl, 3-chlorophenyl or 2-nitro-6-methylphenyl.

3. The compound of claim 1 wherein Z is 2-methylthiophenyl or 2-bromophenyl.

4. The compound of claim 1 wherein Z is 2-bromophenyl or 2-bromo-6-chlorophenyl.

5. The compound of claim 1 wherein Z is 2-bromo-6-chlorophenyl or 3-chlorophenyl.

6. The compound of claim 1 wherein Z is 3-chlorophenyl or 2-nitro-6-methylphenyl.

References Cited
UNITED STATES PATENTS

| | | | |
|---|---|---|---|
| 2,617,818 | 11/1952 | Mowry | 260—454 |
| 3,127,408 | 3/1964 | Hopkins | 260—454 XR |
| 3,231,596 | 1/1966 | Knüsli | 260—454 |
| 3,285,730 | 11/1966 | Weis et al. | 260—454 XR |

OTHER REFERENCES

Konishi: Takeda Kenkryusko Nempo, vol. 24, pp. 233–9, pp. 233 and 236 relied upon, November 1965.

CHARLES B. PARKER, Primary Examiner

D. H. TORRENCE, Assistant Examiner

U.S. Cl. X.R.
71—104; 424—302